United States Patent
Lin et al.

(10) Patent No.: US 6,414,332 B1
(45) Date of Patent: Jul. 2, 2002

(54) MEDIA FOR CONTROL OF THERMAL EMISSION AND METHODS OF APPLICATIONS THEREOF

(75) Inventors: Shawn-Yu Lin; James G. Fleming, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 09/441,221

(22) Filed: Nov. 15, 1999

(51) Int. Cl.[7] .................................................. G02F 1/00
(52) U.S. Cl. ................. 250/505.1; 250/495.1; 273/348.1
(58) Field of Search ........................ 250/505.1, 495.1; 273/348.1

(56) References Cited

U.S. PATENT DOCUMENTS

| | | | | |
|---|---|---|---|---|
| 4,916,014 A | * | 4/1990 | Weber et al. | 428/403 |
| 5,997,795 A | * | 12/1999 | Danforth et al. | 264/219 |
| 6,304,366 B1 | * | 10/2001 | Scalora et al. | 359/328 |

* cited by examiner

*Primary Examiner*—Jack Berman
(74) *Attorney, Agent, or Firm*—Brian W. Dodson

(57) ABSTRACT

A new class of media for control of emission of thermal radiation from an object or part thereof is disclosed. These materials can be used for a wide variety of thermal control applications.

8 Claims, 3 Drawing Sheets

MEDIA FOR CONTROL OF THERMAL EMISSION AND METHODS OF APPLICATIONS THEREOF

This invention was made with Government support under Contract DE-AC04-94DP85000 awarded by the U.S. Department of Energy. The Government has certain rights in the invention.

BACKGROUND

The present invention relates generally to controlling optical properties of physical objects using surface treatments, and more specifically to a new class of materials having tailorable thermal emissivity. These materials harness the ability of photonic media to alter the photon density of states in a volume of space.

The thermal emissivity of a body characterizes the flux of thermal "blackbody" radiation emitted by an object. Common materials have thermal emissivity which changes only slightly as a function of the wavelength of the thermal radiation. As a result, the thermal radiation from most objects is roughly proportional to the ideal "blackbody" spectrum, which is the thermal radiation from a body with unit emissivity.

Thermal radiation is of major importance in the passive detection and observation of objects which can not easily be studied using conventional optical methods (i.e., vision via reflected radiation), and especially when active techniques such as radar are inappropriate. Modern equipment to detect such thermal radiation range from simple infrared pyrometers to hand-held thermal scanners designed to detect and image objects whose temperature varies from the (nominally room-temperature) surroundings by less than 1 K, to sensors which can detect the thermal signature of a object re-entering the atmosphere 1000 kilometers away.

Passive thermal radiation detectors can obtain a variety of information about a distant body. At one extreme, the simple presence within the sensor area of a body with thermal signature different from that of the background can be detected as a simple change in the total amount of radiation detected in the waveband to which the sensor is sensitive. Alternately, several sensors, or a tunable sensor, can be used to determine the thermal radiation flux as a function of photon energy. This information can be fit to a theoretical model to obtain an object temperature, or used in some other form as a signature of the object being observed.

At times it is preferable to obtain an image of the object being studied. This is accomplished in many ways, perhaps the best of which currently is a matrix of infrared sensors, each of which studies a single pixel, the sum of the pixels making up an image of the area under study. Again, the image sensor can use differences in absolute magnitude, or can examine the scene at several wavelengths to determine object temperature or thermal signature.

Among the purposes of such passive thermal detection can be the identification of a threat, estimation of size of an unknown body, or obtaining information to guide weaponry to attack said body. In such instances, the observer has a reasonable idea what to look for, and is seeking characteristic thermal signatures. That is, a body having a thermal image or a thermal signature consistent with a known threat will attract the attention of the observer. It is clearly in the interest of a party who wishes to avoid detection, identification, or interception, to find ways of altering the thermal signature of the body.

Traditional methods of camouflage typically have little effect on thermal signatures, which is one of the reasons that such detection techniques are so popular. For example, although coloring a reflecting surface is easily accomplished (e.g., through inclusion of dyes and colorants), introducing significant variations in emissivity as a function of wavelength to alter a thermal signature is much more difficult.

A prior art example of a coating which can provide wavelength dependent thermal emissivity appears in selective solar absorption coatings. Such coatings, usually based on black nickel, which use surface roughness to tailor the thermal radiation properties of the overall system. In brief, a low-emissivity material is given a rough, dendritic surface structure. The characteristic wavelength of thermal radiation from a 6000K source is about 0.5 $\mu$m (micrometers), whereas that from a 600K collector is 10 times longer, or 5 $\mu$m. If the dendritic surface structure has a characteristic size scale of ~1–2 $\mu$m, the roughness will have little effect on the thermal radiation emitted by the collector, which will then exhibit the low emissivity typical of metals. However, the shorter wavelength thermal radiation from the sunlight will penetrate the dendritic surface structure, and therein scatter strongly until essentially all of the sunlight is absorbed—yielding a high absorptivity. Such a structured surface can therefore produce dramatically different thermal radiation properties in different temperature ranges.

Even though some expedients such as were described above allow tailored thermal radiation properties, there is much room for improvement, both in the area of disguising thermal and optical signatures, and in the area of thermal control. The present invention is intended to address these needs.

SUMMARY OF THE INVENTION

The present invention relates to methods for fabricating and applying thermal emission control media, wherein said media comprise photonic media. The function of said photonic media is to substantially alter the thermal emissivity of a body. The most convenient method of applying such media is in the form of a paint comprising particles of photonic media, but other modes of application can also be effective.

DEFINITIONS

Figure 1:
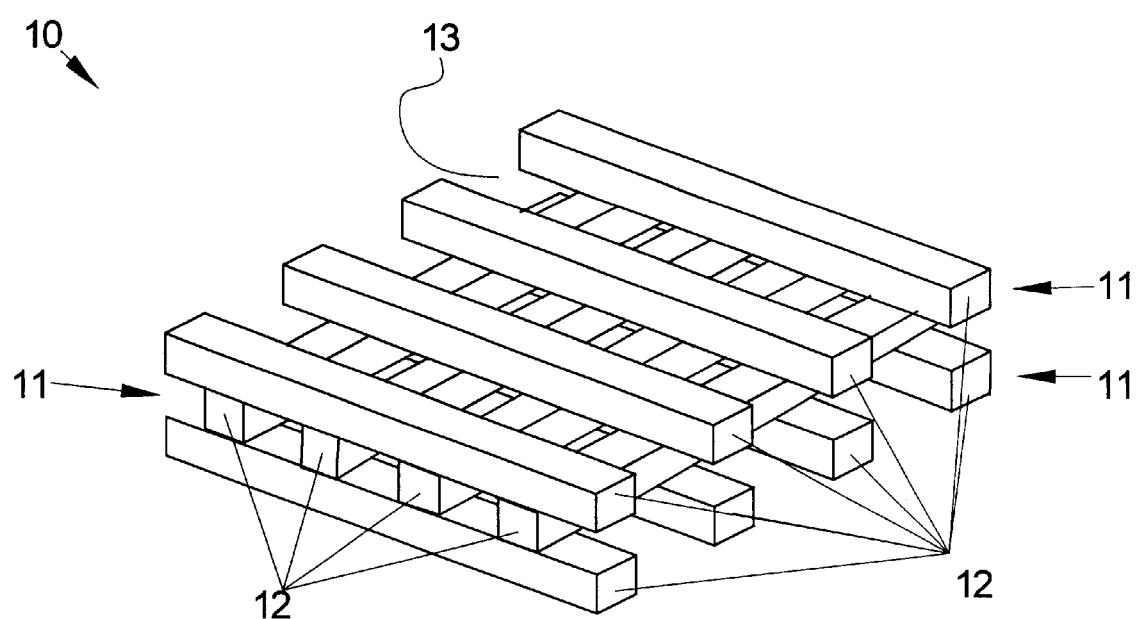
FIG. 1 shows a schematic illustration of a three-dimensional "woodpile" type of periodic dielectric structure typical of photonic media.

Photonic Medium—A material in which spatial variation of dielectric constant results in significant photonic structure within the photon density of states within said material. Unless otherwise stated, the photonic structure appears in all three dimensions.

Photonic Structure—Photonic structure refers to marked increase or decrease in the photon density of states in a photonic medium in a limited range or ranges of photon energies.

Photonic Bandgap—A type of photonic structure in a photonic medium which reduces the photon density of states essentially to zero for all polarizations and orientations within a range of energies. At times the mean energy and/or the width of the range of energies will be called the bandgap—the usage will be clear from the context. Unless otherwise stated, a photonic bandgap is a three-dimensional photonic bandgap.

Partial Photonic Bandgap—A type of photonic structure in a photonic medium which reduces the photon density of states within a range of energies, but where some photons, possibly restricted to specific directions or polarizations, are permitted at every photon energy. Unless otherwise stated, a partial photonic bandgap is a three-dimensional partial photonic bandgap.

Particles of Photonic Medium—Particles which consist essentially of a photonic medium are understood to have dimensions sufficient that they exhibit the desired photonic structure. Typically this means that the particles are significantly larger than the vacuum wavelength of the bandgap.

DETAILED DESCRIPTION

Properly using the present invention requires some understanding of two physical phenomena, emission of thermally excited radiation and the properties of a photonic medium, and their interaction in appropriate regimes. Despite the apparent simplicity of these phenomena, the key interactions underlying the present invention lie in rather complex quantum electrodynamics mechanisms. These mechanisms will be described, rather than derived, such description being sufficient for the purpose of teaching the use of the present invention.

What is commonly called thermal radiation, or blackbody radiation, emitted by a body which is hotter than its surroundings, is to some extent a misnomer. The actual source is the population of the quantum vacuum with photons in sufficient number and energy so that the vacuum is in thermal equilibrium with the body according to the rules of quantum statistical mechanics.

An electromagnetic state of the quantum vacuum is described by an energy and a wavevector, and the particles occupying such states are bosonic in nature, so that the occupation number of a given state can be arbitrarily large. A singly-occupied electromagnetic state is roughly equivalent to a single photon having the energy and wavevector of that state. However, the quantum description of electromagnetic radiation does not include a wave function which describes the likelihood of finding a photon in a given location (as does the quantum theory of matter), but rather describes the behavior of the electromagnetic field as a whole.

Just as a quantum-mechanical harmonic oscillator exhibits some kinetic energy in its ground state, so does each photon state exhibit some electromagnetic fields, instead of no field at all. The expectation value for occupation of each electromagnetic state of the quantum vacuum is one-half, so that the energy of the empty state is hv/2. This phenomenon is often called zero-point energy, or vacuum fluctuations, and is perhaps the most fundamental physical effect in quantum electrodynamics.

Return to the problem of a body with temperature T in thermal equilibrium with the electromagnetic field. To create the proper photon energy distribution for thermal equilibrium, photons must be emitted and absorbed, both by the body and by the quantum vacuum. Only two processes exist through which photons can be generated, those being spontaneous emission and stimulated emission.

Roughly, spontaneous radiation occurs by an unassisted decay of an excited state, whereas in stimulated radiation the natural decay rate is greatly enhanced by the presence of stimulating photons having the decay energy of the excited state. This occurs when the symmetry of the excited state is disturbed by interaction with a stimulating photon, thereby triggering the excited state to emit a photon not at random, but aligned with the stimulating photon.

In the absence of some influence to break the symmetry of the excited state, quantum dynamics suggests that spontaneous radiation would not occur. An adequate, although not precisely correct, way to think about spontaneous radiation is as stimulated radiation, where the stimulation is provided by the vacuum fluctuations of the electromagnetic states (i.e., by interaction with the "half-photon" in each such state). This suggests that there is a deep link between the density of photon states and the rate of spontaneous emission from an excited state.

When this deep link is combined with the theory for the thermal emission flux of a heated body, it is found that that flux at a given photon energy is proportional to the photon density of states at the same energy. This is a key result for the present invention.

Photonic media are materials having a spatially varying dielectric constant. This spatial variation is usually periodic, and for the present applications is generally in three-dimensions, but these conditions are not necessary. The materials of which the photonic media are composed generally exhibit low loss due to absorption in the range of photon energies in which they are intended to be used.

A typical practical photonic medium is shown in FIG. 1. Here is shown a "woodpile" photonic medium 10, comprising an alternating pile of layers 11, each layer 11 comprising an evenly spaced row of parallel strips 12 of material with a first dielectric constant. Alternate layers are rotated by 90 degrees relative to the previous layer. The spaces between the strips 12 are filled by a material 13 having a second dielectric constant. For simplicity as well as high dielectric contrast, material 13 is often simply air.

As light (here meaning electromagnetic radiation in the range where the photonic medium is intended to be applied) passes through the photonic medium, it experiences multiple scattering off the variations in the dielectric constant. It was discovered in the latter part of the 1970's that the spacing and magnitude (or dielectric contrast) of a periodic spatially-varying dielectric constant could be such that the resulting photonic medium would exhibit a photonic bandgap.

A photonic bandgap is a range of energies within which any propagating electromagnetic mode undergoes destructive interference. The effect is that photons within this range of energies cannot penetrate into the photonic medium, and hence are totally reflected therefrom. The physical theory and mathematics describing this effect is nearly identical to that describing the formation of a bandgap in the electronic structure of a semiconductor.

If the photonic medium excludes all photons within a range of energies, no matter what polarization or orientation, then it is said to have a photonic bandgap (sometimes called a complete photonic bandgap). If there are some propagating photon states remaining at all photon energies, the reduction in states is called the introduction of a photonic structure. A photonic structure is any significant reduction in the number of propagating photon states in a range of photon energies, and can include a complete bandgap.

A partial photonic bandgap is a common feature of photonic media, taking one of two generic types, or combinations thereof. The first type is where only photons of certain orientations are allowed in a range of energies, and the second type is where only photons of certain polarizations are allowed in a range of photon energies. Photonic media exhibiting partial photonic bandgaps allow for interesting variations of the present invention, as described later.

The question of what becomes of the forbidden propagating photon states is of fundamental interest, and has been a subject of much conjecture and little evidence since the discovery of photonic media. Among the possibilities are that the photons somehow become localized, and therefore restricted to motion by hopping between localization centers, that the photons continue to transport through the medium, but by diffusion rather than direct propagation, and, in direct analogy with the electronic states in a semiconductor, that the forbidden states cease to exist (more accurately, are moved to other energies outside the bandgap). For many years, this latter seemed perhaps the least likely, however, as shown below the Applicants now have generated what is believed to be the first experimental evidence that the forbidden states vanish. This will be assumed for the present, and the experimental proof presented when a basis for the result is established.

Given the above mechanism, it is clear that introduction of photonic structure into a medium is the direct equivalent of altering the photon density of states of the quantum vacuum in the physical region occupied by the photonic medium. But we have seen earlier that the rate of spontaneous radiation is proportional to the photon density of states.

This suggests that the rate of spontaneous radiation, and hence the magnitude and character of the thermal radiation of a body, are altered for a photonic medium. Specifically, a photonic medium with a photonic bandgap does not emit thermal radiation in the energy range of the bandgap, because the photon density of states therein is zero.

This remarkable result would not be true if the forbidden photon states simply took on another form at the same energy, or if the outer layers of the photonic medium (within which the photonic structure is not fully developed) radiated significantly in the region of the bandgap. In the first case the energy would eventually leak out of the photonic medium, and in the latter the thermal radiation of the body would be defined by that of the surface layers, and not that of the bulk photonic medium.

Figure 2:
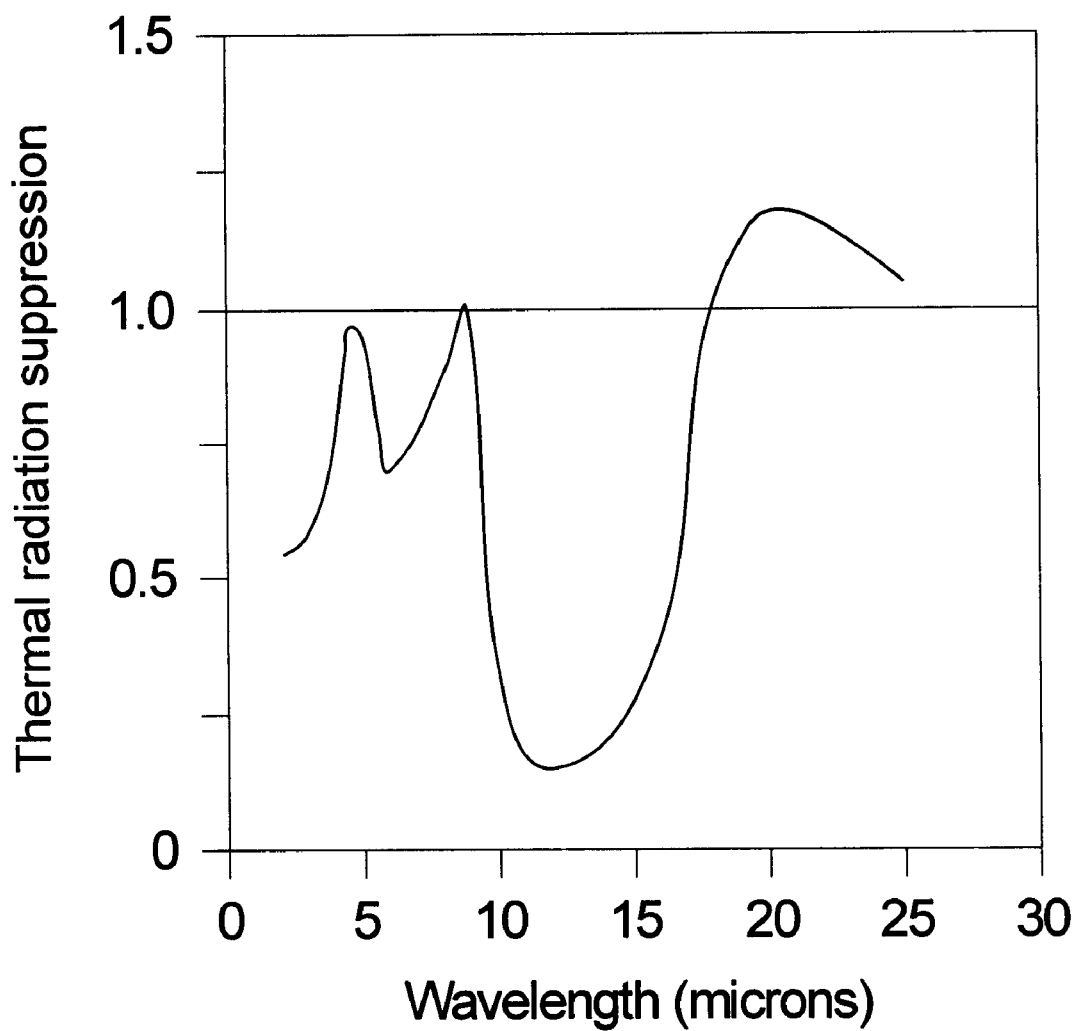
FIG. 2 shows an experimental graph of thermal radiation suppression as a function of photon wavelength for a 5 layer photonic lattice.

FIG. 2 shows a recent measurement by Applicants of the thermal radiation emitted by a woodpile type photonic lattice with a complete photonic bandgap in the 11–15 $\mu$m range, compared to that emitted by an equivalent solid body. The photonic lattice had essentially infinite extent in the plane, and is a stack of five layers of structure. In both cases, the structures were made of silicon. The figure presents the thermal radiation flux as a function of photon vacuum wavelength. Despite the thinness of the photonic lattice in the vertical direction, it can be clearly seen that the thermal radiation flux is severely reduced in the region of the photonic bandgap. This result establishes that the reduction in photon density of states in a photonic medium is a real physical phenomenon, and that it reduces the thermal emissivity in a manner consistent with theory.

The appearance of a body to a passive thermal detection system can be drastically altered by interposing a layer or other suitable structure of photonic medium between the body and the observer. Assume for the moment that the photonic medium has a photonic bandgap complete in a given photon energy range. If that energy range coincides with the band of sensitivity of the observer's detectors, the body will be essentially invisible. The angle of observation will not affect this result, because the bandgap is complete.

If the observer is seeking particular thermal signatures (assumed to be temperature for the moment), he must detect thermal radiation at different wavelengths. If the bandgap energy range overlaps, but does not completely cover, the range of wavelengths being used by the observer to calculate thermal signatures, the thermal signature of the body will shift dramatically. For example, the apparent temperature of the body can shift by a factor of 100. This makes a preprogrammed detection system vulnerable to defeat.

The use of a photonic medium with a partial photonic bandgap offers considerable potential for confusing a detection system based on thermal radiation. If the partial bandgap is of the first type, the intensity of thermal radiation will change significantly as the orientation changes, thereby giving a symmetrical body a thermal signature more characteristic of a highly irregular shape. If the partial bandgap is of the second type, and the detection system is polarization dependent (for example, to differentiate smooth metal from a nonconducting surface), the thermal signature will shift toward an irregular, and hence more likely natural, direction. Similar effects are also seen using photonic media whose photonic structure does not extend to a photonic bandgap.

The above effects can be obtained by introducing a layer of photonic media between a body and an observer. However, a monolithic layer of photonic medium is difficult to apply over a large irregular object, and tends to be rather fragile. As the photonic medium must be the outermost layer (or nearly so) of the body being shielded, protecting the photonic medium from damage can be difficult.

Figure 3:
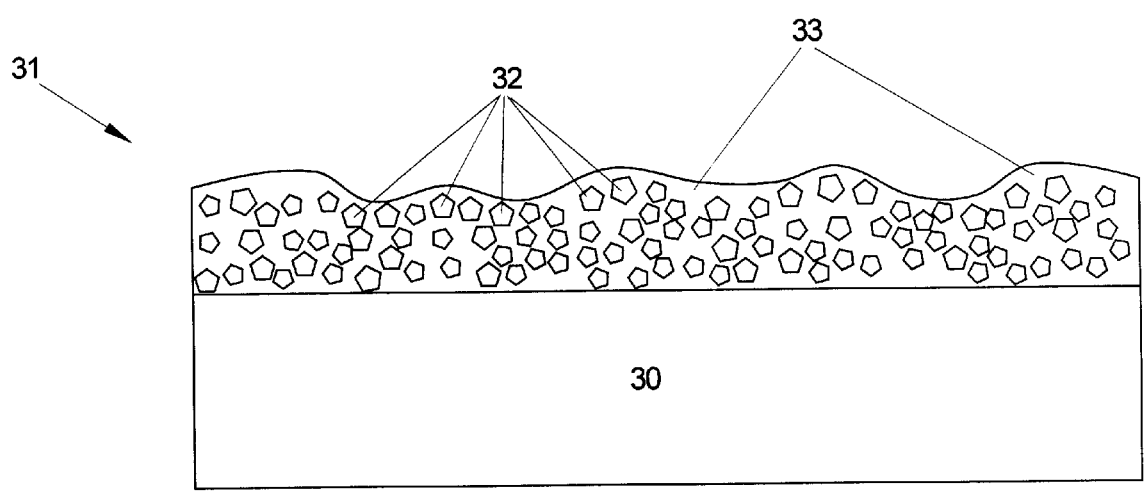
FIG. 3 shows schematically the structure of a photonic paint after the present invention.

Applicants address this limitation by teaching use of a photonic paint. FIG. 3 shows a schematic illustration of the typical components which make up a photonic paint. The illustration shows a substrate 30 covered by a layer 31 of photonic paint. The photonic paint comprises powdered photonic media 32 suspended in a binding medium 33. The powdered photonic media 32 must have particle size large enough that individual powder particles exhibit the desired photonic structure—typical powder dimensions will be somewhat greater than the vacuum wavelength characterizing the photonic structure of the medium from which the powder is obtained.

The proportion of the powdered photonic media by volume should be large enough that the thermal emission of the painted substrate is dominated by that of the photonic medium, and not by that of the binding medium or of the substrate surface. The optics governing the performance of photonic paint is complex enough that in any given case this proportion will be optimized by experiment. However, the issues which go into making an initial estimate are quite general, and are summarized below.

Generally speaking, the larger the volume fraction of particles of photonic media, the better. It might seem that if the binding medium has low emissivity, and an observers line of sight strikes a particle of photonic medium, then the emissivity of the photonic paint is essentially that of the photonic medium. However, this common sense view does not take into account the essentially total reflectivity of the powder in the photonic bandgap. This reflectivity can transfer the thermal radiation of the substrate up through the photonic paint, thereby defeating the purpose of the paint.

A preferred version comprises a high volume fraction of particles of photonic media, where the particles almost have a complete photonic bandgap, but not quite. The binding medium is essentially transparent to the bandgap wavelengths, so that the thermal radiation of the substrate is lost in multiple lossy reflections between the particles of photonic media.

Another preferred version comprises a high volume fraction of particles of photonic media having a complete photonic bandgap, and a binding medium which slightly absorbs the bandgap wavelengths. The paint thickness will be sufficient that the thermal radiation emitted by the substrate is absorbed in the binding medium before it can escape from the paint.

The examples and implementations described above are intended to illustrate various aspects of the present invention. Many other combinations can be used to obtain photonic paints with a variety of properties. The scope of the invention is set by the claims interpreted in view of the specification.

We claim:

1. An emissivity control material comprising particles of photonic medium and a binding medium, said particles being suspended in said binding medium.

2. The material of claim 1, wherein the spacing between said particles of photonic medium is less than 10 times the particle size.

3. The material of claim 1, wherein the spacing between said particles of photonic medium is less than 3 times the particle size.

4. The material of claim 1, wherein said particles of photonic medium exhibit a photonic bandgap in a range of photon energies.

5. The material of claim 4, wherein said binding medium absorbs photons within said photonic bandgap.

6. The material of claim 1, wherein said particles of photonic medium exhibit a distribution of photonic bandgaps.

7. The material of claim 4, wherein the photonic medium and the binding medium are substantially transparent to photons having energies outside the photonic bandgap.

8. A thermal emission control method, comprising interposing, between an object and its surroundings, an emissivity control material comprising particles of a photonic medium suspended in a binding medium.

* * * * *